United States Patent
Onishi et al.

(10) Patent No.: US 11,712,828 B2
(45) Date of Patent: Aug. 1, 2023

(54) MOLD DIE, METHOD OF MANUFACTURING MOLD DIE, INJECTION MOLDING APPARATUS, AND METHOD OF MANUFACTURING MOLD PRODUCT

(71) Applicant: KASAI KOGYO CO., LTD., Kanagawa (JP)

(72) Inventors: Tatsumi Onishi, Yokohama (JP); Yusuke Mitsui, Hiratsuka (JP)

(73) Assignee: KASAI KOGYO CG., LTD., Kanagawa (JP)

( * ) Notice: Subject to any disclaimer, the term of this patent is extended or adjusted under 35 U.S.C. 154(b) by 347 days.

(21) Appl. No.: 16/772,467

(22) PCT Filed: Oct. 31, 2019

(86) PCT No.: PCT/JP2019/042838
§ 371 (c)(1),
(2) Date: Jun. 12, 2020

(87) PCT Pub. No.: WO2020/170506
PCT Pub. Date: Aug. 27, 2020

(65) Prior Publication Data
US 2021/0146582 A1     May 20, 2021

(30) Foreign Application Priority Data
Feb. 20, 2019    (JP) ................. 2019-028196

(51) Int. Cl.
*B29C 45/26*      (2006.01)
*B29C 33/38*      (2006.01)
(Continued)

(52) U.S. Cl.
CPC .......... *B29C 45/26* (2013.01); *B29C 33/3842* (2013.01); *B29C 33/42* (2013.01);
(Continued)

(58) Field of Classification Search
None
See application file for complete search history.

(56) References Cited

U.S. PATENT DOCUMENTS 5,575,961 A * 11/1996 Kuwabara ............... B29C 43/46
425/327
9,724,847 B2 * 8/2017 Torii ................... B29C 33/3828
(Continued)

FOREIGN PATENT DOCUMENTS

| CN | 102009329 A | 4/2011 |
|---|---|---|
| DE | 102017107315 A1 | 10/2017 |

(Continued)

OTHER PUBLICATIONS

CN102009329A—Google Patents—machine translation (Year: 2009).*
(Continued)

*Primary Examiner* — Emmanuel S Luk
(74) *Attorney, Agent, or Firm* — United IP Counselors, LLC

(57) ABSTRACT

A mold cavity which is a mold die includes a die body and a plating layer provided on the surface of a mold surface. In this case, the mold surface has a leather-grain transfer surface for forming a grain pattern. The leather-grain transfer surface includes a first uneven-shape part and a second uneven-shape part formed at the surface of the first uneven-shape part and smaller in an uneven-shape width than the first uneven-shape part. The uneven-shape width falls within a range of 10 μm or more and less than 500 μm. The plating layer is an electroless-plating layer. A thickness of at least part of the plating layer falls within a range of 0.1 μm or more and less than 10 μm.

14 Claims, 9 Drawing Sheets

(51) Int. Cl.
  *B29C 33/42* (2006.01)
  *C23C 18/32* (2006.01)
  *C23C 18/18* (2006.01)
  *B29L 31/30* (2006.01)

(52) U.S. Cl.
  CPC .......... *C23C 18/1827* (2013.01); *C23C 18/32* (2013.01); *B29K 2905/08* (2013.01); *B29L 2031/3041* (2013.01)

(56) References Cited

U.S. PATENT DOCUMENTS

| | | | |
|---|---|---|---|
| 2012/0024709 A1* | 2/2012 | Sung | C25D 1/10 |
| | | | 205/70 |
| 2017/0292201 A1 | 10/2017 | Higuchi | |
| 2020/0346421 A1* | 11/2020 | Amemiya | G02B 5/003 |

FOREIGN PATENT DOCUMENTS

| | | |
|---|---|---|
| JP | H10-156835 A | 6/1998 |
| JP | H11-179736 A | 7/1999 |
| JP | 2007-160637 A | 6/2007 |
| JP | 2017-185753 A | 10/2017 |
| JP | 2019-006067 A | 1/2019 |
| WO | 1999/032268 A1 | 7/1999 |

OTHER PUBLICATIONS

CN102009329A—Google Patents—machine translation (Year: 2023).*
JP2007160637A—Google Patents—machine translation (Year: 2023).*
International Search Report for International Application No. PCT/JP2019/042838 dated Jan. 7, 2020, Japan, 2 pages (in Japanese).
Office Action for corresponding Chinese Application No. 201980004893.8 dated Nov. 2, 2021, China, 8 pages.
Extended European Search Report of corresponding European patent application No. 19897570.8 dated Oct. 28, 2022, 11 pages.
Daniels U: "Leicht Und Sicher Entformen Chemisch-Nickel-Dispersionsschichten Als Entformungshilfe", Kunststoffe, Carl Hanser Verlag, Munchen, Germany, vol. 91, No. 10, Oct. 1, 2001 (Oct. 1, 2001), XP001081220, ISSN: 0023-5563.
Anonym: "Metalle haben Probleme", Oct. 1, 2001 (Oct. 1, 2001), pp. 1-8, XP055973794, Retrieved from the Internet: URL: https://www.novoplan.com/mat/pdf/forum2001.pdf.
Anonym: "Spritzgiesswerkzeuge mit garantierter Wirtschaftlichkeit.", Nov. 8, 2007 (Nov. 8, 2007), pp. 1-8, XP055973640, Retrieved from the Internet: URL: https://www.novoplan.com/mat/pdf/forum2007.pdf.

* cited by examiner

MOLD DIE, METHOD OF MANUFACTURING MOLD DIE, INJECTION MOLDING APPARATUS, AND METHOD OF MANUFACTURING MOLD PRODUCT

CROSS-REFERENCE TO RELATED APPLICATIONS

This application is a National Stage. Entry application of PCT International Application No. PCT/JP2019/042838, filed on Oct. 31, 2019, which claims the priority benefit of Japanese Patent Application No. 2019-028196, filed on Feb. 20, 2019, the entire contents f both of which are hereby incorporated by reference.

BACKGROUND

1. Technical Field

The present invention relates to a mold die, a method of manufacturing a mold die, an injection molding apparatus, and a method of manufacturing a mold product.

2. Description of the Background

A conventional interior component such as a door trim for lining the cabin of an automobile is generally an injection-molded synthetic resin product, in consideration of manufacturability and moldability. A known interior component is made up of the mold product as a base member and a natural-leather or artificial-leather surface member, which is bonded to the surface of the base member for the purpose of implementing upscale material texture or a sophisticated motif.

A recent known interior component has its base member's motif surface (front surface) provided with a grain pattern formed of minor uneven shapes, so as to resemble natural leather in appearance. Thus, without the surface member, the interior component successfully resembles the texture of natural leather by the base member alone. That is, the interior component with upscale material texture or a sophisticated motif is provided cost-effectively and productively. The forming the grain pattern on the surface of the base member is performed simultaneously with injection molding, using a die body which includes a leather-grain transfer surface with uneven shapes corresponding to the grain pattern.

For example, Japanese Unexamined Patent Application Publication No. 11-179736 (hereinafter referred to as "Patent Literature 1") discloses a mold die including a mold cavity whose surface is provided with a grain pattern. On the surface of the grain pattern, a plating layer which contains a luster agent is provided. Patent Literature 1 also discloses that the thickness of the plating layer falls within a range of 5 μm to 50 μm.

BRIEF SUMMARY

Here, in the conventional mold die, minor defects disadvantageously exist at the surface (the mold surface) of the die body. As a result of being filled with resin, the defects create minor burrs on the surface of the mold product, which impair the surface quality. Since the defects each have an undercut shape, the resin at the surface of the mold product is pulled when being released from the mold die. This invites generation of the burrs.

Meanwhile, as disclosed in Patent Literature 1, the plating layer at the surface of the mold die coats such defects. This alleviates the defects at the surface of the mold product associated with the defects. On the other hand, there are increasing demands for a grain pattern which is formed of finer uneven shapes than the conventional ones, so as to implement the natural authentic texture of natural leather. Here, the plating layer disclosed in Patent Literature 1 disadvantageously covers not only the defects but also a fine grain pattern, and fails to provide the surface quality that a mold product is desired to possess.

The present invention has been made in view of the circumstances, and an object thereof is to provide a mold die capable of implementing a fine grain pattern on a mold product with excellent surface quality, a method of manufacturing the mold die, an injection molding apparatus, and a method of manufacturing the mold product.

In order to solve the problem, a first inventive aspect provides a mold die including: a die body including a mold surface having a shape corresponding to sculpturing of a mold product; and a plating layer provided on a surface of the mold surface. The mold surface has a leather-grain transfer surface for forming, at a surface of the mold product, a grain pattern formed of a plurality of uneven shapes. The leather-grain transfer surface includes at least a first uneven-shape part and a second uneven-shape part formed at a surface of the first uneven-shape part and smaller in an uneven-shape width than the first uneven-shape part, the uneven-shape width in the first uneven-shape part and the uneven-shape width in the second uneven-shape part each falling within a range of 10 μm or more and less than 500 μm. The plating layer is an electroless-plating layer. A thickness of at least part of the plating layer falls within a range of 0.1 μm or more and less than 10 μm.

In the first inventive aspect, the plating layer is an electroless-plating layer, and a thickness of the whole plating layer preferably falls within a range of 0.1 μm or more and less than 10 μm.

In the first inventive aspect, the plating layer contains Ni as a main component.

A second inventive aspect provides a method of manufacturing a mold die, including performing electroless plating on a die body including a mold surface having a shape corresponding to sculpturing of a mold product, to form a plating layer on a surface of the mold surface. The mold surface has a leather-grain transfer surface for forming a grain pattern formed of a plurality of uneven shapes on the surface of the mold product. The leather-grain transfer surface includes a first uneven-shape part and a second uneven-shape part formed at a surface of the first uneven-shape part and smaller in an uneven-shape width than the first uneven-shape part, the uneven-shape width in the first uneven-shape part and the uneven-shape width in the second uneven-shape part each falling within a range of 10 μm or more and less than 500 μm. The forming the plating layer is performed so that a thickness of at least part of the plating layer falls within a range of 0.1 μm or more and less than 10 μm.

In the second inventive aspect, the forming the plating layer is preferably performed so that a thickness of the entire plating layer falls within a range of 0.1 μm or more and less than 10 μm.

The second inventive aspect further includes, prior to the forming the plating layer, firming the leather-grain transfer surface at the mold surface. In this case, the forming the leather-grain transfer surface preferably includes at least a first step of performing etching on the surface of the mold surface, to form the first uneven-shape part, and a second step of performing etching on the surface of the mold surface having undergone the first step, to form the second uneven-shape part.

A third inventive aspect provides an injection molding apparatus including the mold die according to the first inventive aspect.

A fourth inventive aspect provides a method of manufacturing a mold product including applying the mold die according to the first inventive aspect to at least one of a mold cavity and a mold core, to manufacture a mold product.

The present invention implements a fine grain pattern to a mold product with excellent surface quality.

DETAILED DESCRIPTION

Figure 1:
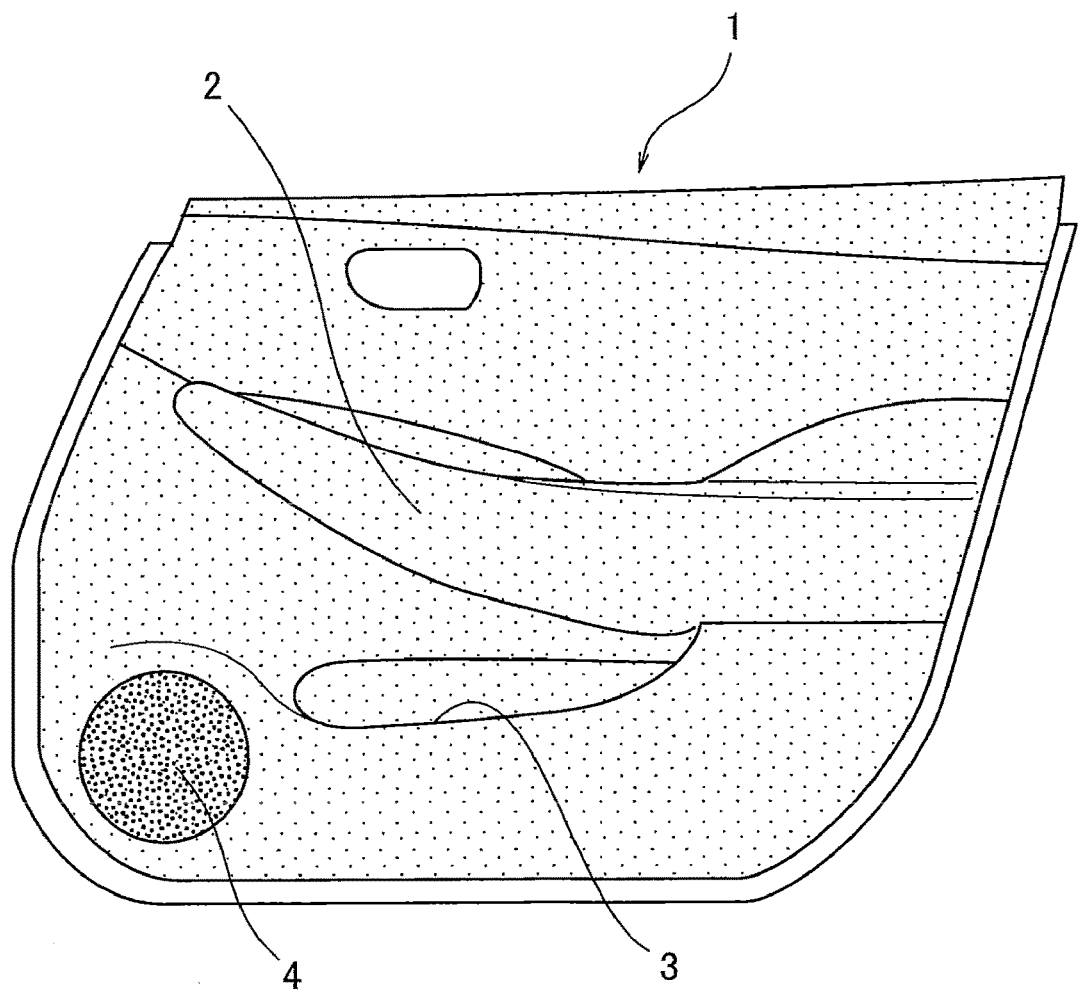
FIG. 1 is a front view of a door trim which is a mold product.
Figure 2:
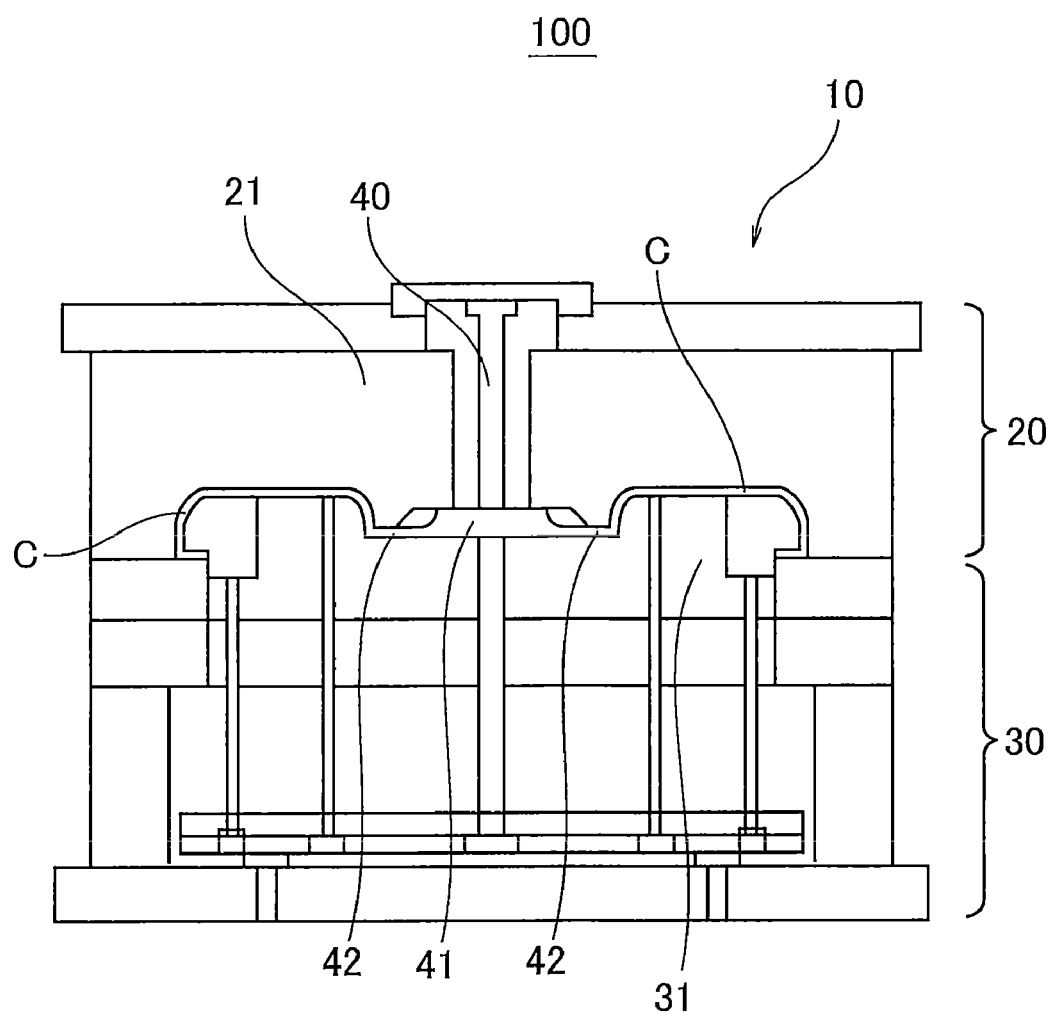
FIG. 2 is an explanatory illustration of an injection molding apparatus which is mainly formed of a mold die for a door trim.

In the following, with reference to the drawings, a description will be given of a mold die, a method of manufacturing the same, an injection molding apparatus, and a method of manufacturing a mold product according to the present embodiment. FIG. 1 is a front view of a door trim 1 which is a mold product. FIG. 2 is an explanatory illustration of an injection molding apparatus 100 which is mainly formed of a mold die 10 for the door trim 1.

Firstly, prior to the description of the mold die 10 and the method of manufacturing the same, a description will be exemplary given of the door trim 1 as an automobile interior component which is a mold product.

The door trim 1 covers most of the cabin-side surface of a door trim panel (not shown) for providing decorativeness or any other function. The door 1 is a mold product obtained by injection molding using general synthetic resin such as polypropylene (PP) resin or ABS resin, and formed to have a predetermined shape.

The door trim 1 is provided with a door armrest 2 which bulges into the cabin at its intermediate portion in the top-bottom direction. The door armrest 2 extends in the front-rear direction so as to allow the passenger to put his/her arm. The door trim 1 is further provided with a door pocket 3 at a lower position than the door armrest 2. In front of the door pocket 3, a speaker grille 4 is provided.

On the surface of the doo 1, that is, on the motif surface appearing in the cabin, a grain pattern is formed. The grain pattern is transferred by the mold die 10 in molding with the mold die 10. The grain pattern forms minor uneven shapes on the motif surface of the door trim 1. Thus, a three-dimensional motif which resembles natural leather is implemented. In this manner, the door trim 1 which is a base member being a mold product alone can implement upscale material texture or a sophisticated motif which may be obtained by bonding natural leather as the surface member to the surface of the base member.

Next, a description will be given of the mold die 10 and the injection molding apparatus 100. The injection molding apparatus 100 is an apparatus that includes the mold die 10, and manufactures a mold product using the mold die 10. The mold die 10 is a mold die used in molding a mold product through the injection molding technique, and mainly formed of a mold cavity 20 and a mold core 30. By being closed, the mold cavity 20 and the mold core 30 create a cavity C serving as mold space between them.

In the manufacturing process of the mold product, a mold product is manufactured using the injection molding apparatus 100, that is, the mold die 10. Specifically, after the mold cavity 20 and the mold core 30 are closed, the cavity C filled with melted resin through the resin passage formed by a spur 40, a runner 41, a gate 42 and the like. When the resin in the cavity C is cooled and solidifies, the mold cavity 20 and the mold core 30 are open, to deliver the solidified resin mold product from the mold die 10. Thus, the mold product formed to have a predetermined shape is provided.

Figure 3A:
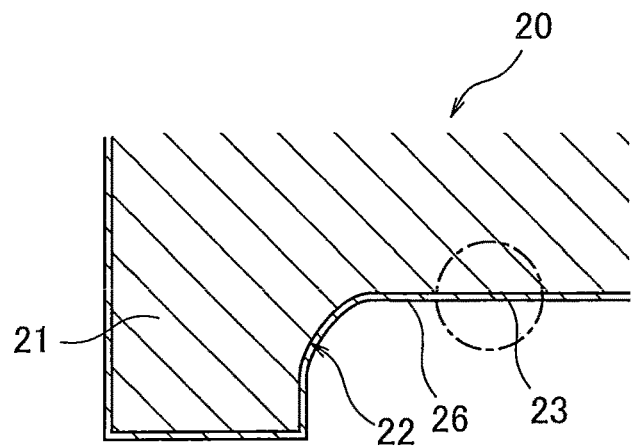
FIGS. 3A to 3C are explanatory illustrations schematically showing the main part of a mold cavity.
Figure 3B:
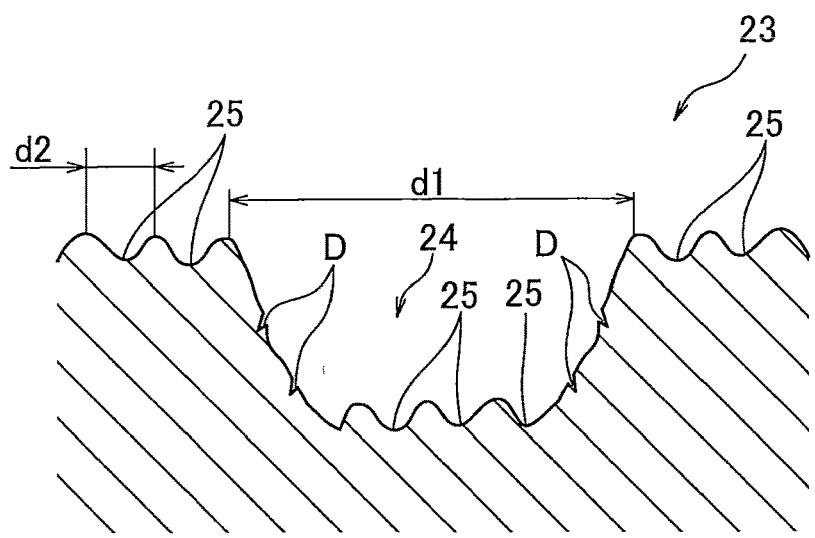
Figure 3C:
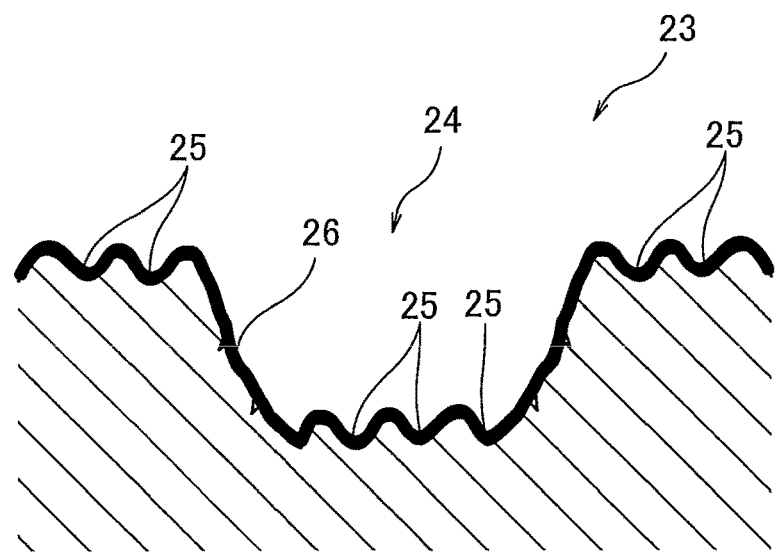

FIGS. 3A to 3C are explanatory illustrations schematically showing the main part of the mold cavity 20. FIG. 3A is art explanatory illustration schematically showing the main part of the mold cavity 20. FIGS. 3B and 3C are each an explanatory illustration showing, in art enlarged manner, the region encircled by an alternate long and short dashed line in FIG. 3A. Note that, FIG. 3B does not illustrate a plating layer 26 in order to clearly show the shape of the die body 21.

The mold cavity 20 is a die in the mold die 10 for molding the motif surface of the door trim 1. The mold cavity 20 is mainly formed of the die body 21.

The die body 21 is formed of metal such as aluminum or any general steel for a mold die. The die body 21 has a mold surface 22 corresponding to the sculpturing of a mold product. The mold surface 22 creates the cavity C with the mold core 30 (specifically, e mold surface of the die body 31' when closed (see FIG. 2).

The mold surface 22 has a leather-grain transfer surface 23 for forming a grain pattern formed of a plurality of uneven shapes on the surface of a mold product. The leather-grain transfer surface 23 includes a first uneven-shape part 24 and a second uneven-shape part 25 each having an uneven shape. In the leather-grain transfer surface 23, the width of an uneven shape in the first uneven-shape part 24 and that in the second uneven-shape part 25 (the distance between the crests in the cross section of the die body 21) fall within a range of 10 μm or more and less than 500 μm.

The first uneven-shape part 24 is an uneven shape where an uneven shape width d1 falls within a range of greater than 10 μm and less than 500 μm (as an example in the present embodiment, 30 μm or more and less than 500 μm). The first uneven-shape part 24 has a function of transferring a relatively great uneven shape on the surface of the mold product. On the other hand, the second uneven-shape part 25 is an uneven shape where an uneven shape width d2 falls within a range of 10 μm or more and smaller than the width d1 of the uneven shape of the first uneven-shape part 24 (as an example in the present embodiment, 10 μm or more and less than 30 μm). The second uneven-shape part 25 has a function of transferring a smaller uneven shape than the first uneven-shape part 24 on the surface of the mold product. The second uneven-shape part 25 is formed in every region in the leather-grain transfer surface 23 including the surface of one first uneven-shape part 24. By virtue of both the first uneven-shape part 24 of a greater uneven shape and the second uneven-shape part 25 of a smaller uneven shape existing, the grain pattern transferred onto the surface of a mold product attains a complicated three-dimensional shape. This implements natural authentic texture of natural leather on the surface of the mold product.

As one characteristic of the present embodiment, the mold cavity 20 includes the plating layer 26 provided at the surface of the die body 21 including the mold surface 22. The plating layer 26 is an electroless-plating layer formed by electroless plating, and is mainly composed of Ni. The plating layer 26 is provided on the surface of the die body 21 by a substantially constant thickness. The thickness of the plating layer 26 falls within a range of 0.1 μm or more and less than 10 μm, preferably 0.1 μm or more and less than 5 μm, and further preferably 2 μm or more and less than 5 μm.

The plating layer 26 is smaller in thickness than the uneven shape width d2 of the second uneven-shape part 25 which transfers a minor uneven shape. Thus, the plating layer 26 is formed on the surface of the uneven shape of the second uneven-shape part 25 without burying the uneven shape. Thus, provision of the plating layer 26 will not hinder implementing the uneven shape of the second uneven-shape part 25. On the other hand, out of the uneven shapes in the mold surface 22, any uneven shape smaller than the thickness of the plating layer 26, that is, any uneven shape smaller than the second uneven-shape part 25 is covered with the plating layer 26. The uneven shape smaller than the second uneven-shape part 25 is not the intended uneven shape that contributes to the grain pattern, but corresponds to a defect D that occurs during manufacturing the mold cavity 20. Accordingly, the uneven shape attributed to the first uneven-shape part 24 and also the minor uneven shape attributed to the second uneven-shape part 25 are implemented and, additionally, the plating layer 26 is capable of selectively burying just the defects D at the surface of the mold surface 22, that is, the uneven shapes smaller than the second uneven-shape part 25.

The mold core 30 is a die in the mold die 10 for molding the back surface of the door trim 1 (the surface that faces the door trim panel). The mold core 30 is mainly, formed of the die body 31 which includes the mold surface. Since the mold core 30 is for molding the back surface of the door trim 1, its mold surface is not provided with the leather-grain transfer surface. Accordingly, contrary to the mold cavity 20, the mold core 30 is not provided with a plating layer. Note that, in view of improved mold product releasability and rust resistance of the mold core 30, the mold core 30 may provided with a predetermined plating layer, for example, a plating layer similar to the plating layer 26 of the mold cavity 20.

Figure 4:
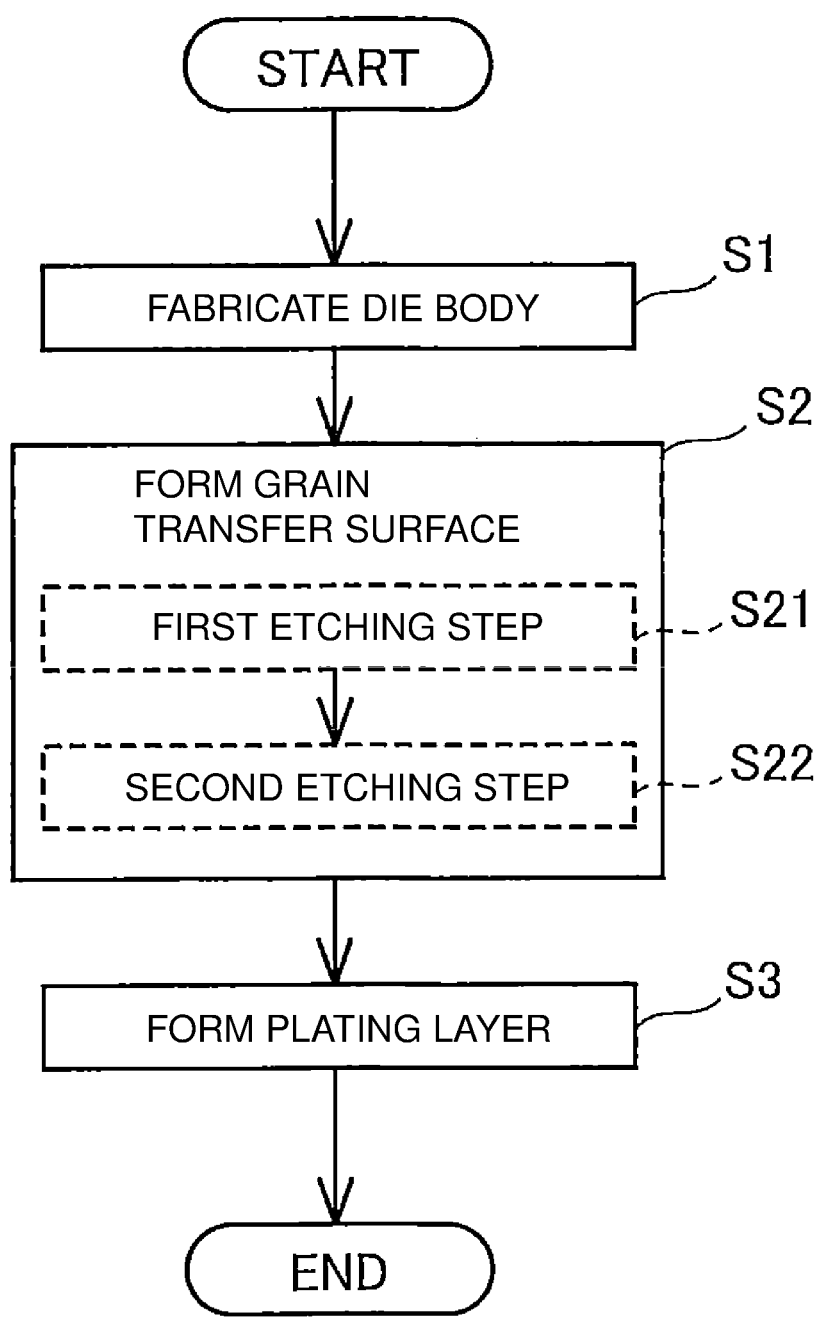
FIG. 4 is a flowchart of a method of manufacturing a mold die.

In the following, a description will be given of a method of manufacturing the mold die 10 which is one characteristic of the present embodiment. Specifically, the description will be exemplarily given of a method of manufacturing the old cavity 20 including the leather-grain transfer surface 23. FIG. 4 is a flowchart of the method of manufacturing the mold die 10.

Firstly, the die body 21 that has the mold surface 22 corresponding to sculpturing of a mold product is fabricated (S1). The die body 21 is fabricated by, for example, subjecting a steel block for a mold die to removing work with a machine tool. The steel block for a mold die may be aluminum or general steel for a mold die.

Next, the leather-grain transfer surface 23 is formed at the mold surface 22 of the die body 21 (S2). The leather-grain transfer surface 23 is for forming a grain pattern formed of a plurality of uneven shapes on the surface of the mold product. The forming the leather-grain transfer surface 23 is carried out by etching using a chemical agent. The etching mainly includes: a step of masking, with paint the like, the side surfaces and the bottom surface of the die body 21 and any regions in the mold surface 22 excluding the leather-grain transfer surface 23; a step of drawing, with acid-resistant ink, a pattern corresponding to the grain pattern in the region of the mold surface 22 to be the leather-grain transfer surface 23 (hereinafter referred to as "the etching region"); and a step of immersing the die body 21 in an acidic solution to corrode the etching region.

In the present embodiment, in the step of forming the leather-grain transfer surface 23, a plurality of etching steps are performed. Specifically, in the first etching step, etching is performed on the surface of the mold surface 22, to form the first uneven-shape part 24 of the uneven shape width d1 (for example, in a range of 30 μm or more and less than 500 μm) (S21). Next, in the second etching step, etching is performed on the surface of the mold surface 22 having undergone the first etching step, to form the second uneven-shape part 25 of the uneven shape width d2 (for example, in a range of 10 μm or more and less than 30 μm) (S22).

The leather-grain transfer surface 23 according to the present embodiment includes the first uneven-shape part 24 which has a relatively great uneven shape and the second uneven-shape part 25 which has a minor uneven shape in a range including the surface of the first uneven-shape part 24. Accordingly, the etching is performed twice respectively for the uneven-shape parts 24, 25. Here, when a plurality of (three or more) uneven-shape parts differing in the width of the uneven shape are designed, the number of etching steps are set according to the number of the designed uneven-shape parts. Therefore, the etching is performed not necessarily twice. In forming the two uneven-shape parts 24, 25 according to the present embodiment, the etching may be performed twice or more for each of the uneven-shape parts 24, 25.

When the leather-grain transfer surface 23 is formed, next, the plating layer 26 is formed on the die body 21 including the mold surface 22 (S3). The forming the plating layer 26 is carried out by electroless plating. The electroless plating may be electroless Ni—P plating, electroless Ni—B plating, electroless Ni—P-PTFE composite plating, electroless Ni—P—B plating or the like.

Specifically, the die body 21 is immersed in a plating bath filled with electroless plating liquid. On the surface of the die body 21, the plating layer 26 mainly composed of Ni (nickel) is deposited by the electroless plating. The thickness of the plating layer 26 can be controlled by changing the immersion time in the plating bath. Through the immersion time, the plating layer 26 is formed to have a thickness falling within a range of 0.1 μm or more and less than 10 μm (preferably a range of 0.1 μm or more and less than 5 μm, further preferably a range of 2 pin or more and less than 5 μm), The die body 21 having immersed for a predetermined immersion time is taken out from the plating bath.

Through the foregoing steps, the mold cavity 20 which includes the die body 21 with the leather-grain transfer surface 23 and provided with the plating layer 26 is manufactured.

The plating layer 26 is formed on the surface of the second uneven-shape part 25 without burying the uneven shape. Thus, provision f the plating layer 26 will not hinder implementing the uneven shape of the second uneven-shape part 25 in the leather-grain transfer surface 23.

Meanwhile, in order to implement a grain pattern on the surface of the mold product, the etching is performed on the die body 21. Here, on the mold surface uneven shapes smaller than the second uneven-shape part 25, that is, defects D associated with the etching occur. Particularly, in the case where the second uneven-shape part 25 smaller than the first uneven-shape part 24 is formed for implementing the grain pattern of the natural texture, a plurality of steps of etching must be performed. This increases the total etching time during which the die body 21 is exposed to the etching solution, contributing to occurrence of the defects D at the mold surface 22.

In this regard, since the thickness of the plating layer 26 is designed to fall within a range of 0.1 μm or more and less than 10 μm, any uneven shape smaller than the second uneven-shape part 25 is covered with the plating layer 26. Accordingly, the uneven shape attributed to the first uneven-shape part 24 and also the minor uneven shape attributed to the second uneven-shape part 25 are implemented and, additionally, just the uneven shapes (defects D) on the mold surface 22 smaller than the second uneven-shape part 25 are selectively buried.

In the following, a description will be given of a scheme as a comparative example against the scheme of the plating layer 26 obtained by the electroless plating according to the present embodiment. The scheme of removing minor defects D occurring at the mold surface 22 may be: (1) forming an electrolytic-plating layer on the mold surface 22 by electroplating; (2) forming a synthetic resin layer on the mold surface 22 by blasting synthetic resin; or (3) smoothing the mold surface 22 by shot blasting.

Firstly, the scheme of electroplating has an aspect not applicable to a mold product such as an automobile interior component like the door trim With a mold die for molding a mold product with complicated sculpturing such as an automobile interior component, charges are locally set at a particular site attributed to the shape, adversely resulting in variations in the amount of metal deposition. Thus, the thickness is not properly controlled and the minor uneven shape of the second uneven-shape part 25 is not implemented.

The scheme of forming a synthetic resin layer is not suitable for a mold die for mass production of an automobile interior component for its being low in wear resistance and scratch resistance. The scheme of blasting synthetic resin is unlikely to attain thickness control and fails to implement the minor uneven shape of the second uneven-shape part 25. Furthermore, its being low in chemical resistance limits the type of chemicals for maintaining the mold die, which means, the scheme is disadvantageous in terms of maintainability.

The scheme of shot blasting is incapable of completely removing unwanted defects D. Accordingly, burrs may occur at the surface of the mold product. Furthermore, particles may disadvantageously crush not only the defects D but also the second uneven-shape part 25, and the desired fine grain pattern may not be implemented.

In this regard, in the mold cavity 20 according to the present embodiment, the platting layer 26 selectively buries just the uneven shapes (defects D) smaller than the second uneven-shape part 25 in the surface of the mold surface 22. Thus, the uneven shape attributed to the first uneven-shape part 24 and also the minor uneven shape attributed to the second uneven-shape part 25 remain in the mold surface 22.

In particular, the plating layer 26 obtained by electroless plating is free from thickness variations due to the shape of the mold die, contrary to a plating layer obtained by electroplating. As a result, provision of the plating layer 26 will not hinder properly implementing the uneven shape of the second uneven-shape part 25 in the leather-grain transfer surface 23.

By virtue of containing Ni as a main component, the plating layer 26 is excellent in wear resistance and scratch resistance. Accordingly, the present embodiment is suitable for a mold die for mass production of an automobile interior component.

By virtue of the plating layer 26 being formed over the entire mold surface 22, no defects D will remain. Since the electroless plating is not the scheme of crushing the uneven shape, the uneven shape of the second uneven-shape part 25 will not be crushed.

Thus, in the mold cavity 20 according to the present embodiment, since minor defects D are not exposed at the surface of the mold surface 22, the mold cavity 20 is free from any defects D filled with resin. As a result, the present embodiment minimizes the occurrence of the phenomenon that the surface of the mold product is minutely torn (occurrence of burrs). Thus, the fine grain pattern is implemented on the mold product with excellent surface quality.

When the thickness of the plating layer 26 is 10 μm or more, the uneven shape of the leather-grain transfer surface 23 is also smoothed. This tends to increase gloss (shine) on the surface of the mold product. The increased gloss disadvantageously lets the resin material texture to become apparent against the natural leather texture. In this regard, the present embodiment sets the thickness of the plating layer 26 to fall within a range of 0.1 μm or more and less than 10 μm. Accordingly, the uneven shape attributed to the first uneven-shape part 24 and the minor uneven shape attributed to the second uneven-shape part 25 remain on the mold surface 22, This minimizes gloss on the surface of the mold product. As a result, the natural authentic texture of natural leather is implemented on the mold product.

In the present embodiment, just the minor defects D at the surface of the mold surface 22 are selectively buried. This implements the desired grain pattern on the mold product with excellent surface quality.

In the present embodiment, the electroless plating is provided over the entire mold cavity 20. This improves rust resistance and soil resistance of the mold cavity 20. Additionally, the high hardness of the electroless plating improves wear resistance. This contributes to increasing the life of the mold cavity 20.

In the following, a specific description will be given of the effect of the mold cavity 20 according to the present embodiment. A mold product molded using the mold cavity 20 must present a fine grain pattern and also be excellent in surface quality. One factor of poor surface quality of the mold product is the state called "whitening" in which the surface of the mold product appears whitish and cloudy. As a result of an extensive study on the whitening, it has been found that the factor of the whitening includes two totally different phenomena, namely, "scuffs" and "burrs".

Figure 5A:
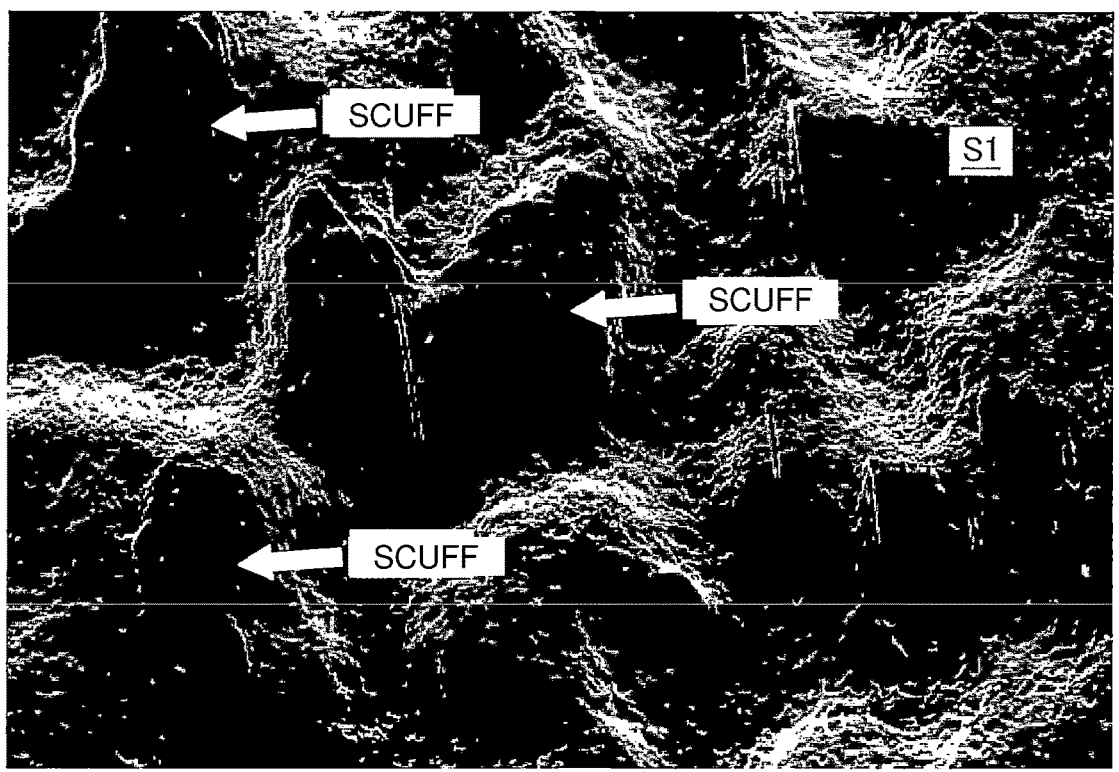
FIGS. 5A and SB are explanatory illustrations of scuffs.
Figure 5B:
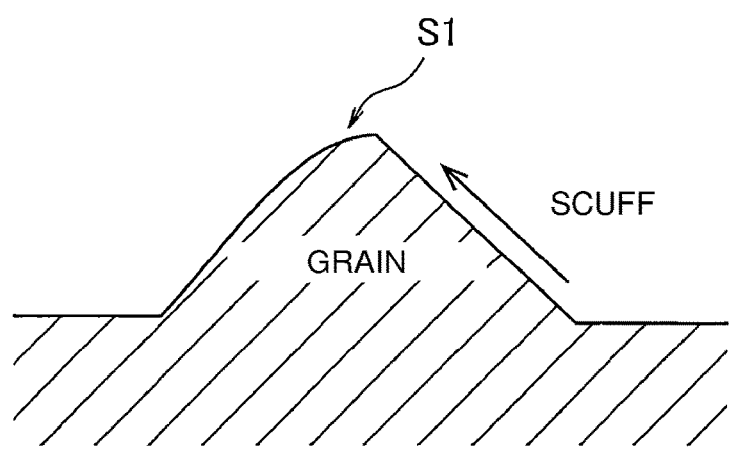

FIGS. 5A and 5B are explanatory illustrations of scuffs. FIG. 5A is a photograph showing a surface S1 of a mold product in an enlarged manner. FIG. 5B is an explanatory illustration schematically showing the surface S1 of the mold product. The scuffs refer to traces with directivity which appear on the surface S1 of the mold surface. The scuffs diffusing light makes whitening visible. Since the scuffs are traces with directivity, the whitening is clearly visible when the surface S1 of the mold product is observed from a specific direction.

As a result of a study on the occurrence mechanism of scuffs, it was concluded that the scuffs are attributed to rubbing between the surface S1 of the mold product and the uneven shape parts 24, 25 of the leather-grain transfer surface 23. That is, when being released from the mold die, the surface S1 of the mold product and the surfaces of the uneven shape parts 24, 25 of the leather-grain transfer surface 23 may be rubbed against each other. Furthermore, the resin in the cavity C contracts when cooled. This may also cause the surface S1 of the mold product and the surfaces of the uneven shape parts 24, 25 of the leather-grain transfer surface 23 of the mold cavity 20 to rub against each other. Because of the rubbing, the traces with directivity occur.

Figure 6A:
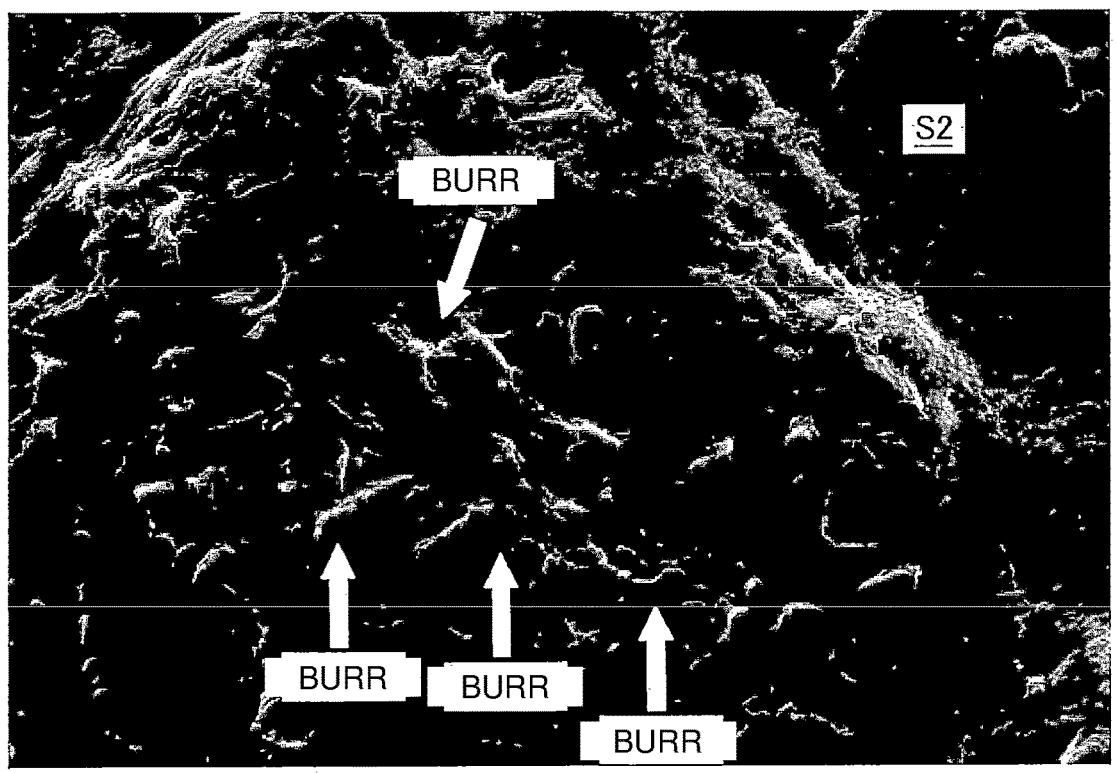
FIGS. 6A and 6B are explanatory illustrations of burrs.
Figure 6B:
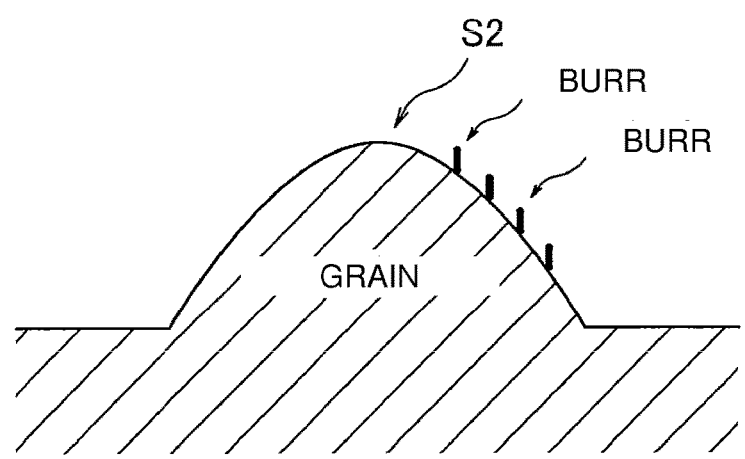

FIGS. 6A and 6B are explanatory illustrations of burrs. FIG. 6A is a photograph of a surface S2 of the mold product in an enlarged manner. FIG. 6B is an explanatory illustration schematically showing the surface S2 of the mold product. The burrs refer to clusters of burred surface of S2 of the mold product. The burrs diffusing light makes whitening visible.

Figure 7A:
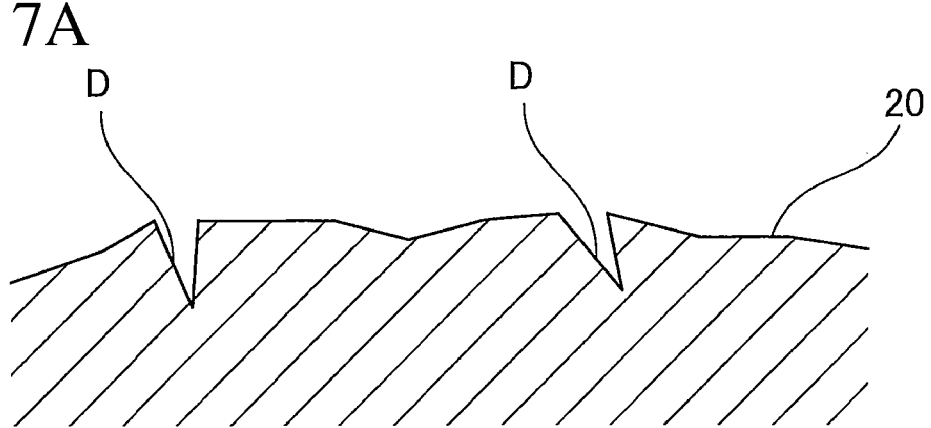
FIGS. 7A to 7C are explanatory illustrations of the mechanism of occurrence of burrs.
Figure 7B:
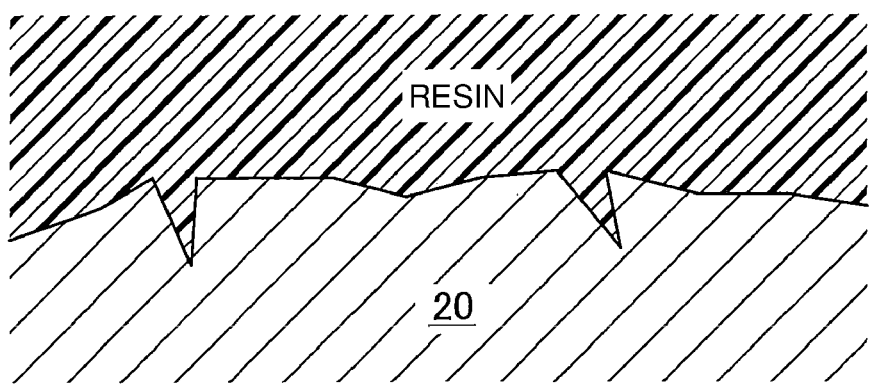
Figure 7C:
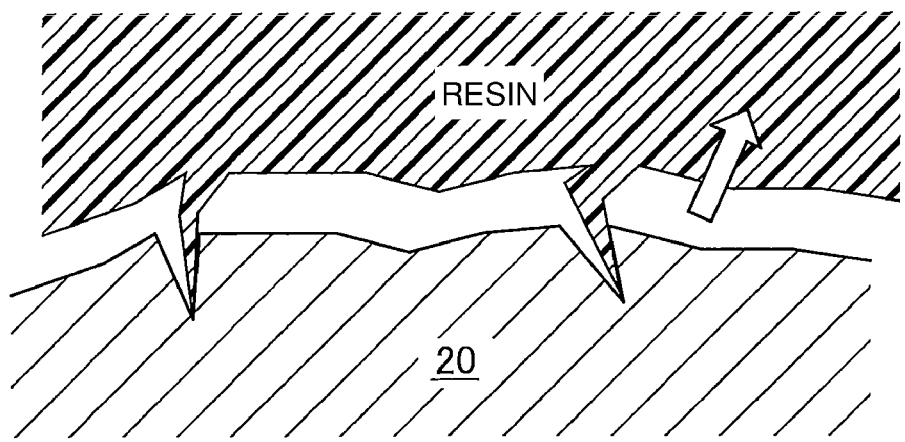

FIGS. 7A to 7C are explanatory illustrations of occurrence mechanism of burrs. As a result of a study on the occurrence mechanism of burrs, it has been concluded that the burrs are caused by corrosion of etching. That is, corrosion of etching forms minor uneven shapes not as great as the second uneven-shape part 25. That is, the defects D occur at the surface of the mold cavity 20 (FIG. 7A). When the defects D are filled with resin in injection molding (FIG. 7B), when being released from the mold die, the resin in the defects D is not smoothly released depending on the removing direction of the mold die (FIG. 7C). As a result, the resin is pulled and the surface of the mold product is minutely torn, that is, burrs occur.

In support of the mechanism, it has also been found that a longer etching time increases burrs. As described above, in order to implement a fine grain pattern, a plurality of steps of etching must be performed in manufacturing the mold cavity 20. This increases the total etching time during which the die body 21 is exposed to the chemical solution, contributing to occurrence of the defects D at the mold surface 22. Thus, as a finer grain pattern is implemented the mold product, whitening because of burrs becomes increasingly apparent.

There is a conventionally known method of providing a plating layer on the surface of the mold die in order to prevent scuffs. The plating layer for preventing scuffs functions to improve releasability and minimize rubbing against the mold die. From this viewpoint, the plating layer with a greater thickness exhibits the effect against scuffs.

On the other hand, the plating layer 26 according to the present embodiment functions to bury the defects D which cause burrs. In the mold cavity 20 having undergone etching, the second uneven-shape part 25 for transferring a fine grain pattern and the defects D smaller than the second uneven-shape part 25 both exist. Here, setting the thickness of the plating layer 26 to fall within a range of 0.1 µm or more and less than 10 µm, just the defects D are selectively covered. That is, just the defects D at the surface of the mold surface 22 are selectively buried and the uneven shape attributed to the first uneven-shape part 24 and also the minor uneven shape attributed to the second uneven-shape part 25 are implemented. As a result, a fine grain pattern is implemented, and excellent surface quality free from the whitening due to burrs is provided. The provision of the plating layer 26 improves the releasability and, as a matter of course, also prevents whitening due to scuffs.

Figure 8:
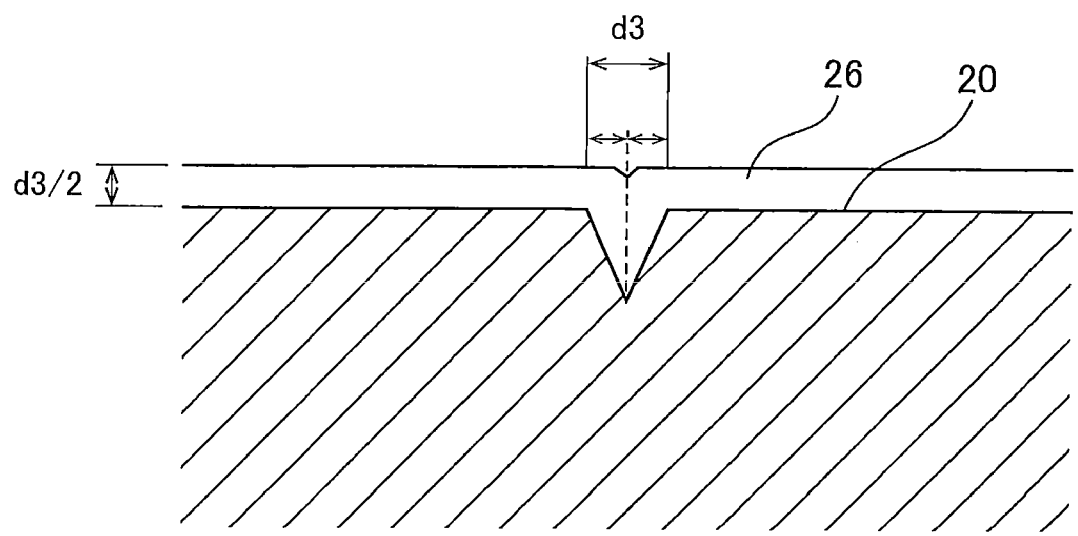
FIG. 8 is an explanatory illustration of the thickness of a plating layer.

As a result of a further study on the thickness of the plating layer 26, it has been found that the further suitable condition is, as shown in FIG. 8, a thickness 50% as great as a width d3 of a defect D (d3/2). With this thickness of about 50%, in the surface where the second uneven-shape part 25 and the defects D smaller than the second uneven-shape part 25 both exist, the defects D are properly buried while the uneven shape of the second uneven-shape part 25 is kept.

In the present embodiment which is predicated on a fine leather grain, the minimum value of the width d2 of the second uneven-shape part 25 is 10 µm. Accordingly, the width d3 of the defect D is less than 10 µm. Therefore, the thickness of the plating layer 26 is preferably less than 5 µm. On the other hand, when a plating layer having a thickness falling within a range of 0.1 µm or more and less than 2 µm was provided, no whitening was visible while burrs occurred. In view of the foregoing, while it has been noted that the thickness of the plating layer 26 should fall within a range of 0.1 µm or more and less than 10 µm, the thickness preferably falls within a range of 0.1 urn or more and less than 5 µm, and further preferably falls within a range of 2 µm or more and less than 5 µm.

Figure 9:
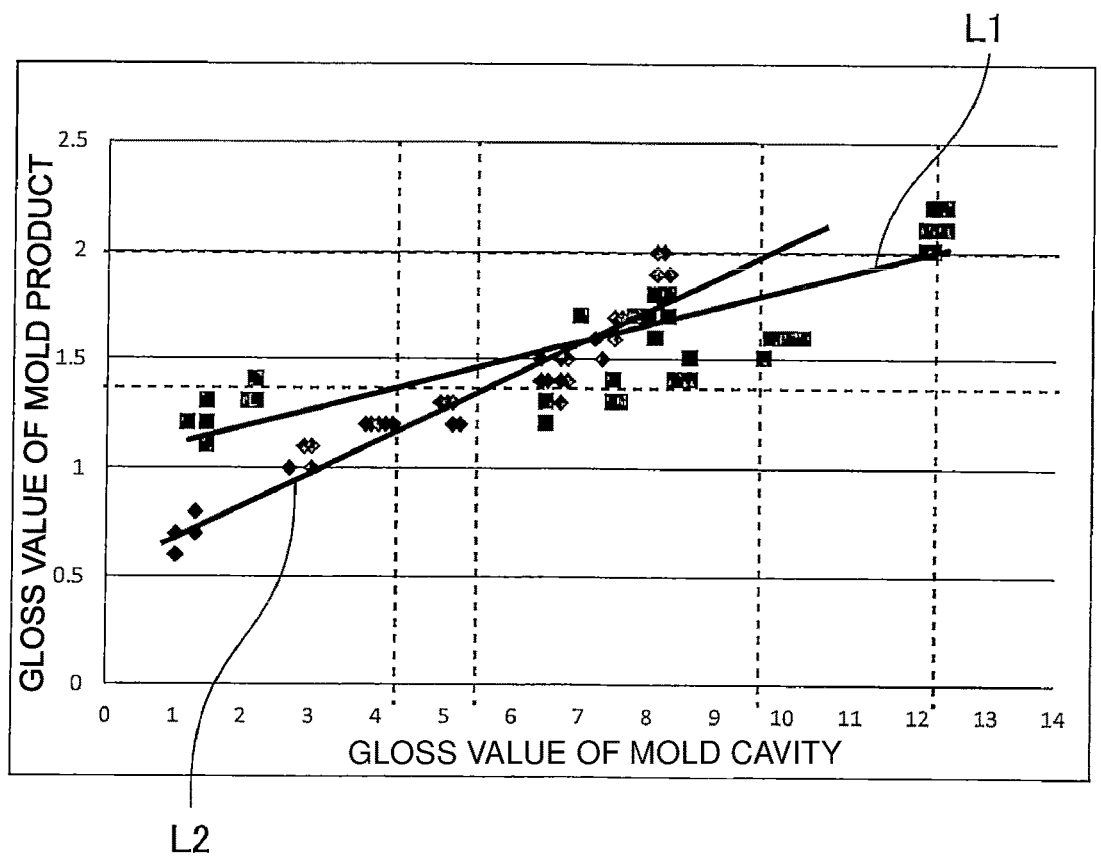
FIG. 9 is an explanatory illustration showing the correlation between the gloss value of the mold cavity and the gloss value of the mold product.

In the following, a description will be given of a specific example of the mold cavity 20 according to the present embodiment. FIG. 9 is an explanatory illustration showing the correlation between the gloss value of the mold cavity and the gloss value of the mold product. The gloss value is a numerical value representing gloss (shine). As the value is greater, gloss is great.

In FIG. 9, data represented by squares is a plot of correlation between the gloss value of the mold cavity 20 according to the present example and the gloss value of the mold product molded using the mold cavity 20. Specifically, a plurality of mold cavities 20 of different gloss values were fabricated, with the plating layer 26 having a thickness selected from a range of 2 µm or more and less than 5 µm (for example, 4 µm). The correlation was obtained using a glossmeter configured to measure the gloss value of the mold cavity 20 and that of the mold product under the condition of an identical incident or exit angle of 60°. Line L1 is a line approximating the plot data. Note that, the measuring method is not limited to the foregoing.

On the other hand, data represented by rhombuses is a plot of correlation between the gloss value of the mold cavity and the gloss value of the mold product molded using the mold cavity. Specifically, a plurality of mold cavities 20 of different gloss values were fabricated, with no plating layer and without having their surfaces treated by sand blasting. The correlation was obtained using a glossmeter configured to measure the gloss value of the mold cavity and that of the mold product under the condition of an identical incident or exit angle of 60°. Line L2 is a line approximating the plot data. Note that, the measuring method is not limited to the foregoing.

As shown in FIG. 9, line L1 representing the correlation between the gloss value of the mold cavity 20 according to the present example and the gloss value of the mold product is inclined milder than line L2 representing the correlation between the gloss value of the mold cavity having undergone sand blasting and the gloss value of the mold product.

Here, for example, it is assumed that the target gloss value demanded of the mold product in view of the specification as a final product falls within a range of 1.4 to 2. The mold cavity 20 according to the present example is capable of providing a mold product of a target gloss value range, when the gloss value of the mold cavity 20 falls within a range of about 4.2 to 12.2. On the other hand, the mold cavity having undergone sand blasting is capable of providing a mold product of a target gloss value range, when the gloss value of the mold cavity falls within a range of about 5.5 to 9.5. Thus, the mold cavity 20 according to the present example allows a wider gloss value range for the target gloss value of the mold product as compared to the mold cavity having undergone sand blasting. The characteristic shown in FIG. 9 is obtained with the plating layer 26 of other thickness selected from a range of 2 μm or more and less than 5 μm.

This difference from the comparison example is achieved by the provision of the plating layer 26 of a predetermined thickness selected from a range of 2 μm or more and less than 5 μm to the mold cavity 20, which plating layer 26 selectively buries the defects D (the uneven shapes smaller than the second uneven-shape part 25) at the surface of the mold surface 22 while leaving the uneven shape of the first uneven-shape part 24 and that of the second uneven-shape part 25. That is, by virtue of the plating layer 26 burying the minor defects D at the surface of the mold surface 22, the gloss value of the mold product corresponding to the mold cavity 20 with a low gloss value improves (increases). On the other hand, since the first uneven-shape part 24 and the second uneven-shape part 25 are not buried by the plating layer 26, the gloss value of the mold product corresponding to the mold cavity 20 with a high gloss value is maintained. Accordingly, as described above, line L1 representing the correlation between the gloss value of the mold cavity 20 according to the present example and the gloss value of the mold product tends to be inclined milder than line L2 representing the correlation between the gloss value of the mold cavity having undergone sand blasting and the gloss value of the mold product.

It is demonstrated that the mold cavity 20 according to the present example, the plating layer 26 falling within a range of 2 μm or more and less than 5 μm provides the desired gloss value and that whitening due to burrs is minimized.

Additionally, the mold cavity 20 according to the present example is capable of attaining the target gloss value for the mold product with the mold cavity 20 of gloss values managed in a wider range. While the mold cavity 20 is manufactured to attain a target gloss value corresponding to the target gloss value of the mold product, the gloss value of the manufactured mold cavity 20 may vary to some extent. However, since provision of the plating layer 26 permits a wider management range for the mold cavity 20, the gloss value of the mold product can be easily adjusted.

Note that, the description has been given of the example of FIG. 9 in which the thickness of the plating layer 26 falls within a range of 2 μm or more and less than 5 μm. Here, the characteristic similar to the correlation between the gloss value of the mold cavity 20 according to the example and the gloss value of the mold product is provided also with the plating layer 26 having a thickness falling within a range of 0.1 μm or more and less than 2 μm and a range of 5 μm or more and less than 10 μm. That is, the mold cavity 20 provided with plating layer 26 by a thickness falling within a range of 0.1 μm or more and less than 10 μm provides a mildly inclined line of correlation between the gloss value of the mold cavity 20 and the gloss value of the mold product. Thus, the mold cavity 20 provided with the plating layer 26 by a thickness falling within a range of 0.1 μm or more and less than 10 μm, which is a wider gloss value management range for the mold cavity 20, is capable of attaining the target gloss value for the mold product. The widened management range for the mold cavity 20 facilitates adjusting the gloss value of the mold cavity 20.

Note that, when the thickness of the plating layer 26 is 10 μm or more, not only the minor defects D at the surface of the mold surface 22 but also the first uneven-shape part 24 and the second uneven-shape part 25 at the leather-grain transfer surface 23 are buried according to the thickness of the plating layer 26, and smoothed. Therefore, it is considered that the surface of the mold surface 22 of the mold cavity 20 approximates the mirror surface (the gloss value thereof increases) and the gloss value of the mold product less varies. That is, the correlation (line) between the gloss value of the mold cavity 20 and the gloss value of the mold product becomes further mildly, inclined to approximate a substantially horizontal line, and shifts upward (toward higher gloss values). As a result, while the line shows mild inclination, the range of the target gloss value as a final products is exceeded.

The foregoing is the description of the mold die and the method of manufacturing the mold die according to the present embodiment. The present invention is not limited to the embodiment, and various changes may be made within the scope of the invention.

For example, in the above-described embodiment, on the premise that a grain pattern is formed on one side surface of a mold product, the description has been given of the mold die as to an exemplary mold cavity. On the other hand, in the case where the grain pattern is to be formed by a mold core, the scheme of the present embodiment may be applied to the mold core or both of the mold cavity and the mold core.

While the door trim has been exemplary described as the mold product molded by the mold die, the present invention is applicable to a mold die for molding various types of automobile interior components such as a rear side trim, a roof trim, a pillar garnish, or a roof rail garnish.

In the present embodiment, the texture of natural leather is implemented by a grain pattern. Here, various types of appearance besides natural leather can be implemented by the grain pattern formed of minor uneven shapes.

An injection molding apparatus including the mold die, and a method of manufacturing a mold product in which the mold die is at least one of a mold cavity and a mold core also hold as pail of the present invention.

In the present embodiment, the thickness of the whole plating layer falls within a range of 0.1 μm or more and less than 10 μm. On the other hand, the thickness of at least part of the plating layer falling within a range of 0.1 μm or more and less than 10 μm will suffice. That is, in the plating layer, a region having a thickness falling within a range of 0.1 μm or more and less than 10 μm may be selectively provided. "The thickness of the whole plating layer falling within a range of 0.1 μm or more and less than 10 μm" does not intend to exclude partially including a region where the thickness is 10 μm or more due to manufacture variations in forming the plating layer (the recitation means that at least part of the plating layer has a thickness falling within a range of 0.1 μm or more and less than 10 μm).

Furthermore, electroless plating is associated with variations of about ±0.1 to 0.2 μm to the target thickness. Accordingly, the thickness of the plating layer according to the present embodiment preferably allows for such a range of variations.

REFERENCE SIGNS LIST 1 door trim
10 mold die 20 mold cavity
21 die body
22 mold surface
23 leather-grain transfer surface
24 first uneven-shape part
25 second uneven-shape part
26 plating layer
30 mold core
31 die body
40 spur
41 runner
42 gate
100 injection molding apparatus
C cavity
D defect

The invention claimed is:

1. A mold die comprising:
a die body including a mold surface having a shape corresponding to sculpturing of a mold product; and
a plating layer provided on a surface of the mold surface, wherein
the mold surface has a leather-grain transfer surface for forming, at a surface of the mold product, a grain pattern formed of a plurality of uneven shapes,
the leather-grain transfer surface includes at least a first uneven-shape part and a second uneven-shape part formed at a surface of the first uneven-shape part and smaller in an uneven-shape width than the first uneven-shape part, the uneven-shape width in the first uneven-shape part falling within a first range of 30 μm or more and less than 500 μm and the uneven-shape width in the second uneven-shape part falling within a second range of 10 μm or more and less than 30 μm,
the plating layer is an electroless-plating layer, and
a thickness of at least part of the plating layer falls within a range of 0.1 μm or more and less than 10 μm.

2. The mold die according to claim 1, wherein
a thickness of the whole plating layer falls within a range of 0.1 μm or more and less than 10 μm.

3. The mold die according to claim 2, wherein the plating layer contains Ni as a main component.

4. The mold die according to claim 1, wherein the plating layer contains Ni as a main component.

5. An injection molding apparatus comprising the mold die according to claim 2.

6. A method of manufacturing a mold product comprising applying the mold die according to claim 2 to at least one of a mold cavity and a mold core, to manufacture a mold product.

7. An injection molding apparatus comprising the mold die according to claim 3.

8. A method of manufacturing a mold product comprising applying the mold die according to claim 4 to at least one of a mold cavity and a mold core, to manufacture a mold product.

9. An injection molding apparatus comprising the mold die according to claim 1.

10. A method of manufacturing a mold product comprising applying the mold die according to claim 1 to at least one of a mold cavity and a mold core, to manufacture a mold product.

11. A method of manufacturing a mold die, comprising
performing electroless plating on a die body including a mold surface having a shape corresponding to sculpturing of a mold product, to form a plating layer on a surface of the mold surface, wherein
the mold surface has a leather-grain transfer surface for forming a grain pattern formed of a plurality of uneven shapes on the surface of the mold product,
the leather-grain transfer surface includes a first uneven-shape part and a second uneven-shape part formed at a surface of the first uneven-shape part and smaller in an uneven-shape width than the first uneven-shape part, the uneven-shape width in the first uneven-shape part falling within a first range of 30 μm or more and less than 500 μm and the uneven-shape width in the second uneven-shape part falling within a second range of 10 μm or more and less than 30 μm,
the forming the plating layer is performed so that a thickness of at least part of the plating layer falls within a range of 0.1 μm or more and less than 10 μm.

12. The method of manufacturing a mold die according to claim 4, wherein the forming the plating layer is performed so that a thickness of the entire plating layer falls within a range of 0.1 μm or more and less than 10 μm.

13. The method of manufacturing a mold die according to claim 12, further comprising
prior to the forming the plating layer, forming the leather-grain transfer surface at the mold surface, wherein
the forming the leather-grain transfer surface includes at least
a first step of performing etching on the surface of the mold surface, to form the first uneven-shape part, and
a second step of performing etching on the surface of the mold surface having undergone the first step, to form the second uneven-shape part.

14. The method of manufacturing a mold die according to claim 11, further comprising
prior to the forming the plating layer, forming the leather-grain transfer surface at the mold surface, wherein
the forming the leather-grain transfer surface includes at least
a first step of performing etching on the surface of the mold surface, to form the first uneven-shape part, and
a second step of performing etching on the surface of the mold surface having undergone the first step, to form the second uneven-shape part.

* * * * *